US012802707B2

(12) United States Patent
Jang et al.

(10) Patent No.: US 12,802,707 B2
(45) Date of Patent: Nov. 17, 2026

(54) AUDIO RENDERING METHOD AND ELECTRONIC DEVICE PERFORMING THE SAME

(71) Applicant: ELECTRONICS AND TELECOMMUNICATIONS RESEARCH INSTITUTE, Daejeon (KR)

(72) Inventors: Dae Young Jang, Daejeon (KR); Kyeongok Kang, Daejeon (KR); Jae-Hyoun Yoo, Daejeon (KR); Yong Ju Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 390 days.

(21) Appl. No.: 18/489,764

(22) Filed: Oct. 18, 2023

(65) Prior Publication Data

US 2024/0135953 A1 Apr. 25, 2024
US 2024/0233746 A9 Jul. 11, 2024

(30) Foreign Application Priority Data

Oct. 19, 2022 (KR) ........................ 10-2022-0134701
Oct. 5, 2023 (KR) ........................ 10-2023-0132816

(51) Int. Cl.
*G10L 25/18* (2013.01)
*H04B 17/318* (2015.01)

(52) U.S. Cl.
CPC ............ *G10L 25/18* (2013.01); *H04B 17/318* (2015.01)

(58) Field of Classification Search
CPC ................... G10L 25/18; H04B 17/318; H04S 2400/13; H04S 7/304; H04S 7/306; H04S 7/302; H04S 7/305; H04S 2400/11; H04S 2420/11; H04S 1/007; H04S 7/30; H04S 7/307; B61K 9/08; G10K 15/08; H04M 3/568; H04N 9/806; H04R 5/04
See application file for complete search history.

(56) References Cited

U.S. PATENT DOCUMENTS 5,943,427 A * 8/1999 Massie .................... H04S 1/007 381/1
8,627,213 B1 * 1/2014 Jouppi .................. H04M 3/568 715/848
8,825,187 B1 * 9/2014 Hamrick ................ H04S 7/304 700/94

(Continued)

OTHER PUBLICATIONS

Daeyoung Jang et al., "Core Experiment on recording distance for air absorption attenuation", International Organisation for Standardisation, ISO/IEC JTC1/SC29/WG6, MPEG Audio Coding, Oct. 2022.

(Continued)

*Primary Examiner* — Gerald Gauthier

(57) ABSTRACT

An audio rendering method and an electronic device performing the same are disclosed. The disclosed audio rendering method includes determining an air absorption attenuation amount of an audio signal based on a recording distance included in metadata of the audio signal and a source distance between a sound source of the audio signal and a listener; and rendering the audio signal based on the air absorption attenuation amount.

13 Claims, 10 Drawing Sheets

(56) References Cited

U.S. PATENT DOCUMENTS

| | | | | |
|---|---|---|---|---|
| 9,372,251 | B2 * | 6/2016 | Soulodre | H04S 7/30 |
| 10,282,160 | B2 | 5/2019 | Yoo et al. | |
| 10,477,337 | B2 | 11/2019 | Tsuji et al. | |
| 11,146,905 | B2 | 10/2021 | Thall et al. | |
| 11,184,727 | B2 * | 11/2021 | Jeon | H04N 9/806 |
| 11,716,586 | B2 * | 8/2023 | Yamamoto | G06N 20/20<br>381/63 |
| 2011/0081024 | A1 * | 4/2011 | Soulodre | H04S 7/30<br>381/17 |
| 2011/0313671 | A1 * | 12/2011 | Nedilko | B61K 9/08<br>702/14 |
| 2014/0270184 | A1 * | 9/2014 | Beaton | H04S 7/307<br>381/17 |
| 2019/0215632 | A1 * | 7/2019 | Chung | H04S 7/30 |
| 2022/0014869 | A1 | 1/2022 | Lee et al. | |
| 2022/0279303 | A1 * | 9/2022 | Marculescu | H04R 5/04 |
| 2023/0224668 | A1 * | 7/2023 | Jang | G10K 15/08<br>381/17 |
| 2024/0135953 | A1 * | 4/2024 | Jang | G10L 25/18 |
| 2024/0196159 | A1 * | 6/2024 | Eronen | G06F 3/012 |
| 2024/0233746 | A9 * | 7/2024 | Jang | H04S 7/306 |

OTHER PUBLICATIONS

Daeyoung Jang et al., “Thoughts on recording distance parameters for air absorption processing”, International Organisation for Standardisation, ISO/IEC JTC1/SC29/WG6, MPEG Audio Coding, Jul. 2022.

* cited by examiner

```
if (!(item->aparams & AParam::NoMediumAttenuation)) {
    // calculate and apply medium attenuation
    if (item->changed & ItemProperty::Position
        || (item->position.cSpace != EAR::CSpace::LCS && renderList.listener.hasMoved)
        || item->changed & ItemProperty::Status) {
        for (int i = 0; i < nBand; i++) {
            // Medium attenuation
            if (item->aparams & AParam::NoInverseMediumAttenuation) {    // Method A
                if (dist > item->recDistance) {
                    itemEqs[item->idx][i] = std::pow(10.0, (absorptionAlpha[i] * (dist - item-
                    >recDistance)) / 20.0);
                } else {
                    itemEqs[item->idx][i] = 1; // 0dB
                }
            } else {    // Method B
                double dl = std::pow(10.0, (absorptionAlpha[i] * (dist - item->recDistance)) / 20.0);
                itemEqs[item->idx][i] = MIN(dl, 10);
            }
            //end.
        }
        // indicate that eq is going to change
        item->changed |= ItemProperty::Eq;
    }
    item->addEq(itemEqs[item->idx].data(), false);
}
```

1010

FIG. 10

AUDIO RENDERING METHOD AND ELECTRONIC DEVICE PERFORMING THE SAME

CROSS-REFERENCE TO RELATED APPLICATIONS

This application claims the benefit of Korean Patent Application No. 10-2022-0134701 filed on Oct. 19, 2022, and Korean Patent Application No. 10-2023-0132816 filed on Oct. 5, 2023, in the Korean Intellectual Property Office, the entire disclosures of which are incorporated herein by reference for all purposes.

BACKGROUND

1. Field of Invention

The following description relates to an audio rendering method and an electronic device performing the audio rendering method.

2. Description of Related Art

Audio services have changed from mono and stereo services to 5.1 and 7.1 channels and to multi-channel services including upper channels such as 9.1, 11.1, 10.2, 13.1, 15.1, and 22.2 channels.

In addition, unlike typical channel services, an object-based audio service technology that stores/transmits/plays an object audio signal and object audio-related information including the location, size, and the like of an object audio, using a single sound source as an object, is in development.

The preceding description is information the inventor(s) acquired during the course of conceiving the present disclosure, or already possessed at the time, and is not necessarily the art publicly known before the present application was filed.

SUMMARY

Example embodiments provide a renderer that may more accurately calculate air absorption attenuation compensated for a distance between a sound source and a listener.

Example embodiments provide a method that may accurately render the timbre of a sound source according to a distance and more accurately model a change in the level and timbre of a sound source by air absorption.

However, the technical aspects are not limited to the preceding aspects, and other technical aspects may also be present.

According to an example embodiment of the present disclosure, there is provided an audio rendering method including: determining an air absorption attenuation amount of an audio signal based on a recording distance included in metadata of the audio signal and a source distance between a sound source of the audio signal and a listener; and rendering the audio signal based on the air absorption attenuation amount.

The determining of the air absorption attenuation amount may include determining the air absorption attenuation amount based on a distance obtained by subtracting the recording distance from the source distance.

The determining of the air absorption attenuation amount may include: in response to the source distance being shorter than the recording distance, determining the air absorption attenuation amount based on a predetermined distance value.

The rendering of the audio signal may include: in response to the source distance being shorter than the recording distance, rendering the audio signal by applying a compensation equalizer that limits a size to a predetermined size.

When the recording distance is not included in the metadata of the audio signal, the recording distance may be determined to be a reference distance comprised in the metadata of the audio signal or a value of zero (0). When the recording distance is determined as 0, compensation for air absorption by the recording distance may be ignored and may thus be processed in the same way as previous processing.

The recording distance may be stored in a recDistance parameter included in a bitstream syntax of each audio signal.

The recording distance may be stored in a recDistance parameter for each sound source of the audio signal.

The recording distance may be any one of: a distance between the sound source of the audio signal and a recording sensor; a distance determined according to a timbre of the sound source; and a predetermined distance.

According to an example embodiment of the present disclosure, there is provided an electronic device including: a processor; and a memory configured to store at least one processor-executable instruction, wherein, when the instruction is executed by the processor, the processor may be configured to: determine an air absorption attenuation amount of an audio signal based on a recording distance included in metadata of the audio signal and a source distance between a sound source of the audio signal and a listener; and render the audio signal based on the air absorption attenuation amount.

The processor may be configured to: determine the air absorption attenuation amount based on a distance obtained by subtracting the recording distance from the source distance.

The processor may be configured to: in response to the source distance being shorter than the recording distance, determine the air absorption attenuation amount based on a predetermined distance value.

The processor may be configured to: in response to the source distance being shorter than the recording distance, render the audio signal by applying a compensation equalizer that limits a size to a predetermined size.

When the recording distance is not included in the metadata of the audio signal, the recording distance may be determined to be a reference distance included in the metadata of the audio signal or a value of 0.

The recording distance may be stored in a recDistance parameter included in a bitstream syntax of each audio signal.

The recording distance may be stored in a recDistance parameter for each sound source of the audio signal.

The recording distance may be any one of: a distance between the sound source of the audio signal and a recording sensor; a distance determined according to a timbre of the sound source; and a predetermined distance.

According to example embodiments described herein, determining an air absorption attenuation amount of an audio signal based on a recording distance and a source distance and rendering the audio signal according to the determined air absorption attenuation amount may effectively prevent a phenomenon in which the timbre of a sound source rendered in a six degrees of freedom (6DoF) environment changes from an actual sound source by the superposition of air absorption according to the recording distance.

According to example embodiments described herein, there is provided a method of more desirably modeling a change in the level and timbre of a sound source by air absorption. That is, the method may compensate for the attenuation in an air absorption amount already included in a sound source according to a recording distance and accurately render the timbre of the sound source according to a distance, thereby accurately rendering a change in the level and timbre of the sound source by air absorption.

According to example embodiments described herein, by adding a recording distance parameter, i.e., recDistance, to an encoder input format (EIF) specification and compensating for air absorption attenuation according to a recording distance using the recording distance parameter transmitted through an audio bitstream, a renderer may more accurately calculate the air absorption attenuation compensated for a distance between a sound source and a listener.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 10 is a diagram illustrating a source code of Distance.cpp according to an example embodiment.

DETAILED DESCRIPTION

Figure 1:
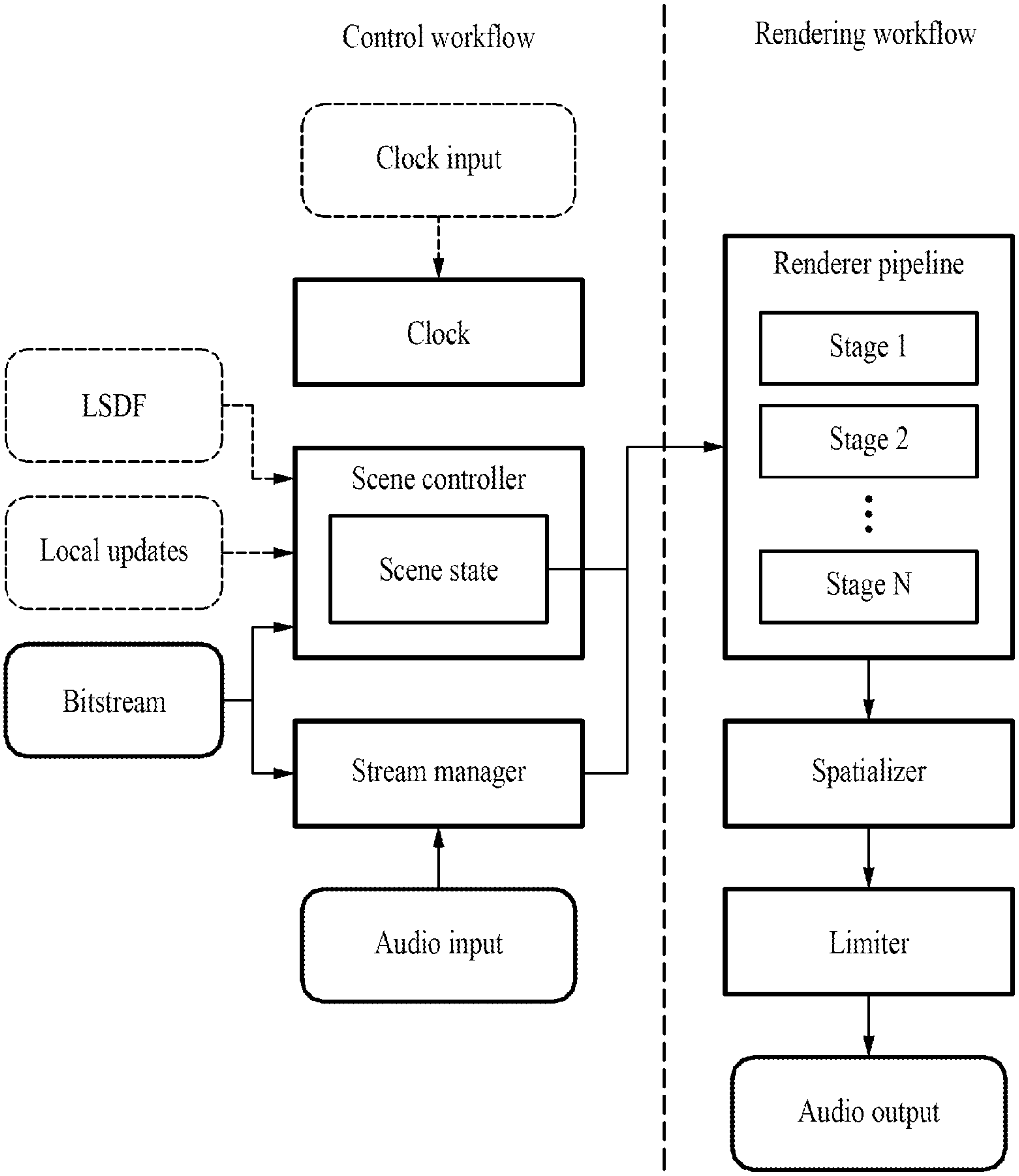
FIG. 1 is a diagram illustrating a control workflow and a rendering workflow of an electronic device according to an example embodiment.

The following structural or functional descriptions of example embodiments described herein are merely intended for the purpose of describing the example embodiments described herein and may be implemented in various forms. However, it is to be understood that these example embodiments are not construed as limited to the illustrated forms.

As used herein, "A or B," "at least one of A and B," "at least one of A or B," "A, B, or C," "at least one of A, B, and C," and "A, B, or C," each of which may include any one of the items listed together in the corresponding one of the phrases, or all possible combinations thereof. Although terms of "first," "second," and the like are used to explain various components, the components are not limited to such terms. These terms are used only to distinguish one component from another component. For example, a first component may be referred to as a second component, or similarly, the second component may be referred to as the first component within the scope of the present disclosure.

Throughout the specification, when a component or element is described as "connected to," "coupled to," or "joined to" another component or element, it may be directly "connected to," "coupled to," or "joined to" the other component or element, or there may reasonably be one or more other components or elements intervening therebetween.

The terminology used herein is for describing various examples only and is not to be used to limit the disclosure. The articles "a," "an," and "the" are intended to include the plural forms as well, unless the context clearly indicates otherwise. As used herein, the term "and/or" includes any one and any combination of any two or more of the associated listed items. As non-limiting examples, terms "comprise" or "comprises," "include" or "includes," and "have" or "has" specify the presence of stated features, numbers, operations, members, elements, and/or combinations thereof, but do not preclude the presence or addition of one or more other features, numbers, operations, members, elements, and/or combinations thereof.

Unless otherwise defined herein, all terms used herein including technical or scientific terms have the same meanings as those generally understood by one of ordinary skill in the art. Terms defined in dictionaries generally used should be construed to have meanings matching contextual meanings in the related art and are not to be construed as an ideal or excessively formal meaning unless otherwise defined herein.

Hereinafter, example embodiments will be described in detail with reference to the accompanying drawings. When describing the example embodiments with reference to the accompanying drawings, like reference numerals refer to like components and a repeated description related thereto will be omitted.

Immersive audio refers to a new acoustic solution that allows users to experience a sense of presence providing a feeling of as if they were actually there by being fully immersed in a given acoustic space. The characteristic of immersive audio is that a human interface environment provides six degrees of freedom (6DoF) user interaction by tracking and responding to a free movement of a listener on X, Y, and Z axes including a head rotation by yaw, pitch, and roll. To provide a sense of immersion/realism in a 6DoF acoustic space, a spatial sound experience that completely matches a visual experience may be important, which requires an important performance factor indicating how desirably an acoustic motion parallax, which may be a condition for the development of echolocation (the ability to recognize spatial information using a sound), and a change in sound expected according to a movement of a listener in an arbitrary space are reproduced.

The requirements for 6DoF immersive audio described above may be summarized as follows:

Spatial sound reproduction: provides a user experience that matches a 6DoF movement of a listener.

Bitstream: provides effective representation and compression of media and metadata.

Reproduction method: reproduces through headphones and a multi-channel speaker.

Sound source model: provides directivity and volume sound source.

Spatial sound rendering: provides convincing indoor or physical acoustic phenomena.

Obstacle effect: provides transmission and diffraction effects by geometric obstacles in the room structure and environment.

Doppler effect: provides a pitch change effect by a high-speed moving sound source.

User sound source: realistically renders local and remote on-site sound of a user in a given environment.

6DoF listener interaction, which is a technology that tracks both a rotation of the head of a listener and a movement of the body of the listener, may be changed in a form from unconditionally consuming a multichannel-based content finished in an existing production stage to consuming an immersive sound experience that changes in real time while moving around the space and interacting with the physical space.

In content authoring and modeling stages, a structure may be designed such that an encoder generates parameters that may be determined in advance and a decoder performs only the processing necessary for real-time rendering according to a movement of a listener.

FIG. 1 is a diagram illustrating a control workflow and a rendering workflow of an electronic device according to an example embodiment.

According to an example embodiment, an electronic device may render an object audio using an audio signal and metadata. For example, the audio signal may be an object audio or an audio stream. The electronic device may be a renderer.

For example, the electronic device may perform real-time auralization on a six degrees of freedom (6DoF) audio scene that may allow a user to interact directly with an entity in a sound scene. The electronic device may render a virtual reality (VR) or augmented reality (AR) scene. For a VR or AR scene, the electronic device may obtain metadata and audio scene information from a bitstream. For an AR scene, the electronic device may obtain listening space information about a listening space where the user is present from a listener space description format (LSDF) file.

The electronic device may output a sound (i.e., audio output) through a control workflow and a rendering workflow, as shown in FIG. 1.

The control workflow may be an entry point of the renderer, and the electronic device may interface with an external system and components through the control workflow. The electronic device may adjust states of entities in a 6DoF scene and implement an interactive interface, using a scene controller in the control workflow.

The electronic device may control a scene state. The scene state may reflect therein current states of all scene objects, including audio elements, transformations/anchors, and geometry. The electronic device may generate all objects in the entire scene before rendering begins and may update a state such that metadata of all the objects reflects a desired scene configuration when reproduction (or playback) begins.

The electronic device may provide an integrated interface to the components of the renderer, using a stream manager, to access an audio stream connected to an audio element in a scene state. The audio stream may be input as a PCB (Printed Circuit Board) float sample. A source of the audio stream may be, for example, a decoded MPEG-H (or Moving Picture Experts Group-H) audio stream or locally captured audio.

A clock may provide an interface to the components of the renderer to provide a current scene time in a unit of seconds. A clock input may be, for example, a synchronization signal of another subsystem or an internal clock of the renderer.

The rendering workflow may generate an audio output signal (i.e., audio output). For example, the audio output signal may be a PCM(Pulse Code Modulation) float. The rendering workflow may be separated from the control workflow. The scene state for transferring all the changes in a 6DoF scene and the stream manager for providing an input audio stream may access the rendering workflow for communication between the two workflows (i.e., the control workflow and the rendering workflow).

A renderer pipeline may auralize the input audio stream provided by the stream manager based on the current scene state. For example, rendering may be performed according to a sequential pipeline such that individual renderer stages implement independent perceptual effects and utilize processing of previous and subsequent stages. The renderer pipeline will be described in detail below with reference to FIG. 2.

A spatializer may terminate the renderer pipeline and may auralize an output of a renderer stage as a single output audio stream suitable for a desired reproduction (or playback) method (e.g., binaural or adaptive loudspeaker rendering).

A limiter may provide a clipping protection function for an audible output signal obtained by the auralization.

Figure 2:
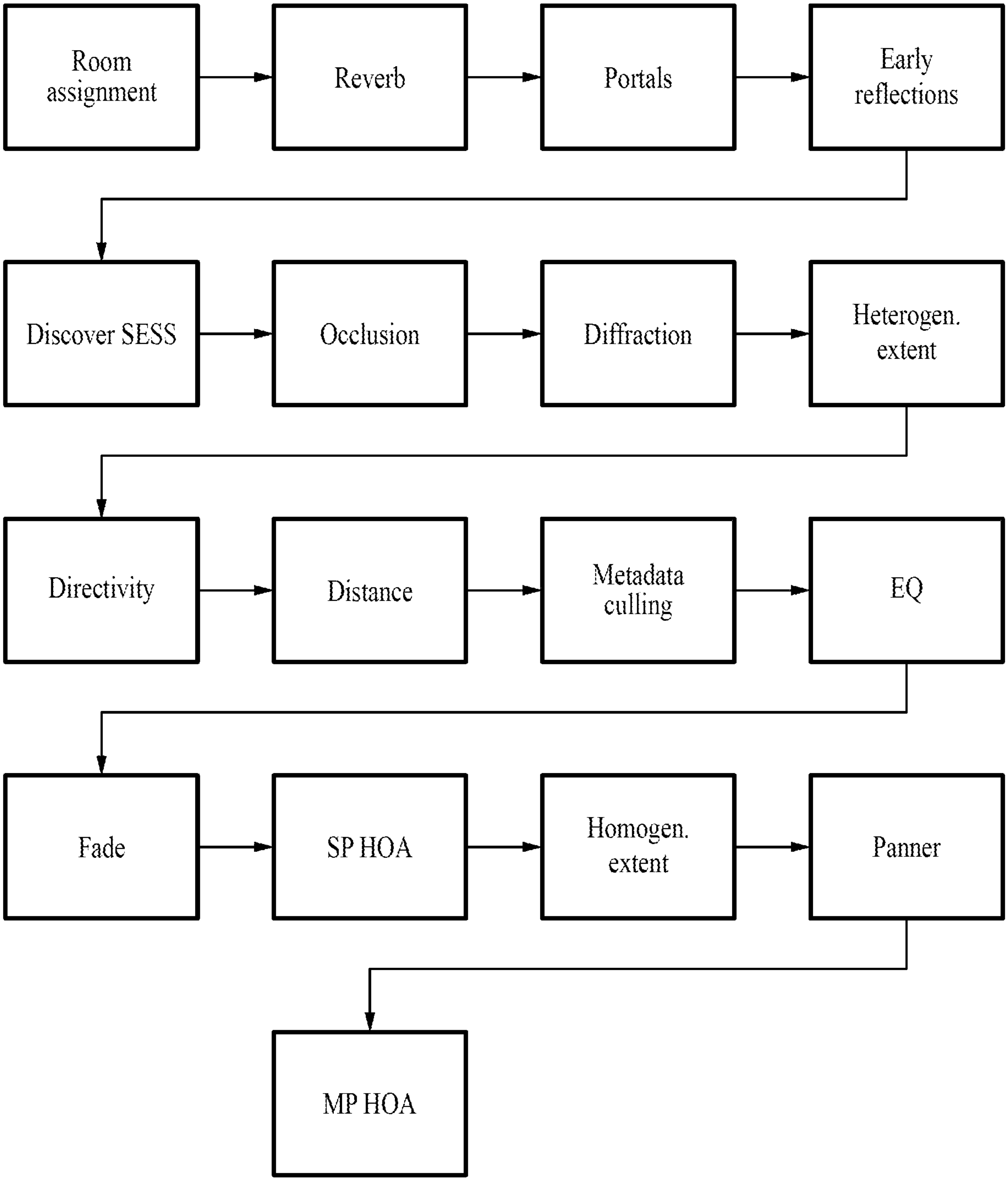
FIG. 2 is a diagram illustrating a renderer pipeline according to an example embodiment.

FIG. 2 is a diagram illustrating a renderer pipeline according to an example embodiment. According to an example embodiment, each renderer stage of a renderer pipeline may be performed according to a set order. For example, the renderer pipeline may include stages, such as, for example, room assignment, reverberation (or reverb as shown), portal, early reflection, spatially extended sound source (SESS) discovery, occlusion, diffraction, heterogeneous extent, directivity, distance, metadata culling, equalizer (EQ), fade, single point (SP) higher order ambisonics (HOA) (SP HOA), homogeneous extent, panner, and multi-point (MP) HOA (MP HOA).

The room assignment stage may apply, when a listener enters a room including sound environment information, metadata of the sound environment information associated with the room to each render item (RI). Using this information, related processing may be performed in subsequent stages—the reverberation and portal stages.

The reverberation stage may generate a reverberation according to the sound environment information of a current space and may, for example, read a reverberation parameter from a bitstream and initialize attenuation and delay parameters of a feedback delay network (FDN) reverberator. In the case of AR, the parameters of the FDN reverberator, which is simpler than an encoder, may be calculated and used by sound environment information of an LSDF directly input to a renderer. An output of the reverberator may be rendered as evenly distributed around a listener by a multi-channel panner to increase a sense of immersion.

The portal stage may model a partially open sound transfer path between spaces with different sound environment information for late reverberation. For example, this stage may model an entire space where sound sources are present as a uniform volume sound source, and may consider a wall to be an obstacle according to shape information of a portal included in the bitstream and render it by a uniform volume sound source rendering method.

The early reflection stage may provide two early reflection rendering methods—high quality and low complexity, which may be selected based on quality and computation (or operation) amount, and it may also be possible to skip this stage.

The high-quality early reflection stage may determine the visibility of an image source relative to an early reflection wall surface that causes an early reflection included in the bitstream and may calculate an early reflected sound. Alternatively, it may use voxel data which is propagation path information about a sound source and listener voxel pair generated in the encoder to enable high-speed computation. For example, in the case in which the voxel data is provided, up to a secondary reflected sound may be processed in real time, and in the case of direct calculation without the voxel data, up to a primary reflected sound may be processed. Additionally, at this stage, both reflection and transmission losses by an obstacle may be processed together.

The low-complexity early reflection stage may replace an early reflection interval using predefined simple early reflection patterns, which may be determined based on a start time of late reverberation, a sound source-listener distance which is a distance between a sound source and a listener, and a location of the listener. From the encoder, parameters summarized through a geometrical analysis of a potential location of the listener may be transmitted, whereby an early reflection pattern in a horizontal plane may be applied.

The volume sound source discovery stage may discover a point at which sound lines radiated in all directions intersect each portal/volume sound source to render a sound source having a spatial size including a portal, and such discovered information may be used in the occlusion and homogeneous extent (or uniform volume sound source) stages.

The occlusion stage may provide occlusion information about an obstacle on a straight path between a sound source and a listener. Status flags for fade in/out processing at an obstacle boundary and EQ parameters by transmittance may be updated in a corresponding data structure. This information may also be used as is in the following stages—the diffraction and homogeneous extent (or uniform volume sound source) stages. In the case of the homogeneous extent stage, a final binaural signal may be generated through an application of a transmittance to a part where a sound line bundle radiated from the listener to a volume sound source is occluded by an obstacle and a part occluded by a part that is not.

The diffraction stage may provide information necessary to generate a diffracted sound source to be transmitted to a listener from a sound source occluded by an obstacle. A diffraction path or diffraction edge information included in a bitstream may be used. For example, for a fixed sound source, a pre-calculated diffraction path may be used, and for a moving sound source, a diffraction path for a current listener may be calculated from a potential edge and used.

The heterogeneous extent (or multi-volume sound source) stage may render a sound source that has a spatial size and includes multiple sound source channels, through which rendering may be performed as internal and external volume sound source representations by multiple channels and or an HOA sound source. In the case of HOA, an external volume sound source representation may be generated from a general internal volume sound source representation. In the case of an object sound source, a user- or object-centered representation may be provided through an arrangement of up to nine sound sources specified in an encoder input format (EIF).

The directivity stage may additionally apply a directivity parameter for a current direction of a sound source, that is, a gain for each band, to an existing EQ value, for a render item with defined directivity information. The directivity information of a bitstream reduced for information compression may be interpolated to match an EQ band.

The distance stage may apply delay, distance attenuation, and air absorption attenuation by a distance between a sound source and a listener. The delay may generate a physical delay and Doppler effect of a render item using a variable delay memory buffer and interpolation/resampling. In the case of a sound source moving at a constant velocity, a distance in a unit of blocks may be calculated and updated. In the case of the distance attenuation, a 1/r attenuation rate may be applied to a point sound source, and a separate attenuation curve may be applied to a volume sound source. In the case of the air absorption attenuation, there may be different sound absorption attenuation curves depending on temperature, humidity, and atmospheric pressure. When these values are not given, a state of temperature 20° C., humidity 40%, and atmospheric pressure 101.325 kPa may be used as a default.

The metadata management stage may, when at least one of render items is attenuated to be below an audible range by the distance attenuation or an obstacle, deactivate the corresponding render item to save a computation amount in subsequent stages.

The equalizer stage may apply a finite impulse response (FIR) filter to a gain value for each frequency band accumulated by obstacle transmission, diffraction, early reflection, directivity, distance attenuation, and the like.

The fade stage may reduce discontinuous distortions that may occur in performing fade in/out processing, when a render item is deactivated or activated or when a listener jumps spatially.

The SP HOA stage may render a background sound by a single HOA sound source. For example, it may convert a signal of an equivalent spatial domain (ESD) format input from a three-dimensional (3D) audio decoder to HOA and then to a binaural signal by a magnitude least squares (MagLS) decoder.

The homogeneous extent (or uniform volume sound source) stage may render a sound source having a spatial size and a single characteristic, such as, large instruments using resonance such as a piano, waterfalls, rain sounds, or room reverberation, and may simulate the effects of countless sound sources in a volume sound source space using a decorrelated stereo sound source. In the case of occlusion by an obstacle, a partially occluded effect may be generated based on the information from the occlusion stage.

The panner stage may render, when rendering multichannel reverberations, each channel signal in head tracking-based global coordinates, using a panning method, for example, vector base amplitude panning (VBAP).

The MP HOA stage may generate a 6DoF sound of content in which two or more HOA sound sources are used simultaneously. For example, it may convert a signal of an ESD format to HOA and process it, and provide 6DoF rendering of a location of a listener using information of a spatial metadata frame calculated in advance by the encoder.

For example, in a rendering workflow (e.g., the rendering workflow of FIG. 1), the electronic device may render gain, propagation delay, and medium absorption of an object audio, based on a distance between the object audio and a listener. For example, the electronic device may determine at least one of the gain, the propagation delay, or the medium absorption of the object audio, in the distance stage of the renderer pipeline.

The electronic device may calculate the distance between each render item (or indicated as RI) and the listener and interpolate a distance between update routine calls of an object audio stream based on a constant velocity model, in the distance stage. A render item, or RI, used herein may refer to all audio elements in the renderer pipeline.

The electronic device may apply the propagation delay to RI-related signals to produce a physically accurate delay and Doppler effect.

The electronic device may apply the distance attenuation to model frequency-independent attenuation of an audio element by the geometrical spreading of source energy. The electronic device may use a model that considers the size of a sound source to attenuate the distance of a geometrically expanded sound source.

The electronic device may model frequency-dependent attenuation of an audio element associated with an air absorption property to apply the medium absorption to the object audio.

The electronic device may determine the gain of the object audio by applying the distance attenuation according to a distance between the object audio and the listener. The electronic device may apply the distance attenuation by geometrical spreading, using a parametric model that considers the size of the sound source.

When reproducing (or playing) audio in a 6DoF environment, a sound level of the object audio may vary depending on the distance, and the size of the object audio may be determined according to the 1/r law in which the size decreases in inverse proportion to the distance. For example, the electronic device may determine the size of the object audio according to the 1/r law in an area where the distance between the object audio and the listener is greater than a minimum distance and less than a maximum distance. The minimum distance and the maximum distance may refer to distances set to apply the distance attenuation, the propagation delay, and the air absorption effect.

For example, the electronic device may identify the location (e.g., 3D spatial information) of the listener, the location (e.g., 3D spatial information) of the object audio, the speed of the object audio, and the like, using metadata. The electronic device may calculate the distance between the listener and the object audio, using the location of the listener and the location of the object audio.

The size of an audio signal to be transmitted to the listener may vary depending on a distance between an audio source (e.g., the location of the object audio) and the listener. For example, in general, the loudness of a sound transmitted to a listener located one meter away from an audio source may be smaller than that of the sound transmitted to a listener located two meters away from the audio source. In a free field environment, the loudness of a sound may decrease at a rate of 1/r (where "r" denotes a distance between an object audio and a listener). In this case, when the distance between the source and the listener is doubled, the loudness of the sound heard by the listener (i.e., a sound level) may decrease by approximately 6 decibels (dB).

The laws associated with attenuation in distance and sound loudness (or size) may be applied in a 6DoF VR environment. The electronic device may use a method of reducing the size of an object audio signal when it is far away from a listener and increasing it when the distance therebetween decreases.

For example, in a case in which a sound pressure level of a sound heard by a listener one meter away from an audio object is OdB, changing the sound pressure level to −6 dB when the listener becomes two meters away from the object may provide a sense of the sound pressure level naturally decreasing.

For example, when the distance between the object audio and the listener is greater than the minimum distance and less than the maximum distance, the electronic device may determine the gain of the object audio according to Equation 1 below. In Equation 1 below. "reference distance" denotes a reference distance, and "current_distance" denotes a distance between an object audio and a listener. The reference distance may refer to a distance at which the gain of the object audio becomes 0 dB, which may be set differently for each object audio.

For example, the metadata may include the reference distance of the object audio.

$$\text{Gain[dB]}=20\log(\text{reference\_distance}/\text{current\_distance}) \quad \text{[Equation 1]}$$

The electronic device may determine the gain of the object audio according to the distance, in consideration of the air absorption effect. The medium attenuation may correspond to frequency-dependent attenuation of the sound source due to the geometrical energy spreading. The electronic device may modify an EQ field at the distance stage to model the medium attenuation by the air absorption effect. According to the medium attenuation, the electronic device may apply a low-pass effect to an object audio that is far away from a listener.

Attenuation of the object audio by the air absorption effect may be determined differently for each frequency region of the object audio. For example, depending on the distance between the object audio and the listener, attenuation in a high-frequency region may be greater than attenuation in a low-frequency region. An attenuation rate may be defined differently according to an environment including, for example, temperature, humidity, and the like. When information such as temperature and humidity of an actual environment is not given or when an attenuation constant by air is calculated, attenuation by actual air absorption may not be accurately applied. The electronic device may apply attenuation of the object audio by distance, using parameters set for the air absorption effect included in the metadata.

Figure 3:
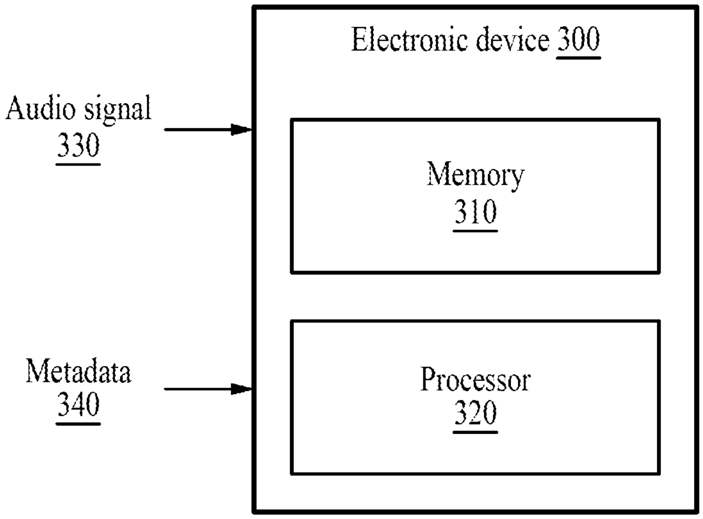
FIG. 3 is a diagram illustrating an electronic device according to an example embodiment.

FIG. 3 is a diagram illustrating an electronic device according to an example embodiment.

Referring to FIG. 3, an electronic device 300 may include a memory 310 and a processor 320. The electronic device 300 may be a renderer and may be implemented as one of various computing devices such as a smartphone, a tablet, a laptop, and a personal computer (PC), one of various wearable devices such as a smartwatch, smart glasses, and a smart ring, one of various home appliances such as a smart speaker, a smart television (TV), and a smart refrigerator, one of various means of transportation such as an autonomous vehicle and a smart vehicle, a smart kiosk, or an Internet of things (IoT) device, or be implemented as a part of such device.

The memory 310 may store various pieces of data used by at least one component (e.g., the processor 320 or a sensor module) of the electronic device 300. The various pieces of data may include, for example, software (e.g., program) and input data or output data for a command related thereto. The memory 310 may include, for example, a volatile memory or a non-volatile memory.

For example, the processor 320 may execute software (e.g., program) to control at least one other component (e.g., a hardware or software component) of the electronic device 300 connected to the processor 320, and may perform various data processing or computation. According to an example embodiment, as at least part of data processing or computation, the processor 320 may store a command or data received from another component (e.g., a sensor module, a communication module, or an interface module) in the memory 310, process the command or data stored in the memory 310, and store resulting data in the memory 310. According to an example embodiment, the processor 320 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the electronic device 300 includes the main processor and the auxiliary processor, the auxiliary processor may be adapted to consume less power than the main processor or to be specific to a specified function. The auxiliary processor may be implemented separately from the main processor or as a part of the main processor.

For operations described below, the electronic device 300 may perform the operations using the processor 320. For example, the electronic device 300 may receive an audio signal 330 and metadata 340. The electronic device 300 may determine an air absorption attenuation amount of the audio signal 330 based on a recording distance included in the metadata 340 of the audio signal 330 and a source distance between a sound source of the audio signal 330 and a listener, and may render the audio signal 330 based on the determined air absorption attenuation amount.

The metadata 340 may include information about the audio signal 330. For example, the metadata 340 may include any one or combinations of 3D position information, volume information, minimum distance information, maximum distance information, and distance-based air absorption effect-related parameters of the sound source corresponding to the audio signal 330.

The recording distance, which refers to a distance between the sound source and a microphone that records the sound source, may be transmitted as being included in the metadata 340 to the electronic device 300. The source distance may refer to the distance between the sound source of the audio signal 330 and the listener who hears the audio signal 330.

The electronic device 300 may determine the air absorption attenuation amount of the audio signal 330 based on the recording distance and the source distance and render the audio signal 330 based on the determined air absorption attenuation amount, thereby effectively preventing a phenomenon in which the timbre of the sound source rendered in a 6DoF environment changes from that of an actual sound source by superposition of air absorption depending on the recording distance. The electronic device 300 may calculate the air absorption attenuation amount according to the distance between the sound source and the listener, using a distance obtained by subtracting the recording distance from the source distance, thereby preventing the air absorption effect depending on the recording distance from overlapping and rendering an audio signal with the same timbre as the actual one.

For example, the recording distance may be reflected in a recording distance parameter added to the attributes of the sound source signal in an encoder input format (EIF) and transmitted to the electronic device 300. The EIF of the encoder may include information such as the type and shape of the sound source, directionality of the sound source, and the like, spatial structure information, spatial material information, sound environment information, update information for a movement of each object and user interaction, and the like, to represent a spatial sound scene of an immersive audio content. Such an immersive audio encoder may generate the metadata 340 necessary for rendering a spatial sound using the spatial sound scene information and transmit the metadata 340 as a bitstream to the electronic device 300 to be used to render the spatial sound in real time. An immersive audio renderer, that is, the electronic device 300, may receive movement and head rotation information of the listener from a sensor of VR headsets and reproduce a spatial sound corresponding to a current location and a head direction of the listener.

Hereinafter, operations of the electronic device 300 will be described in detail with reference to the accompanying drawings.

Figure 4:
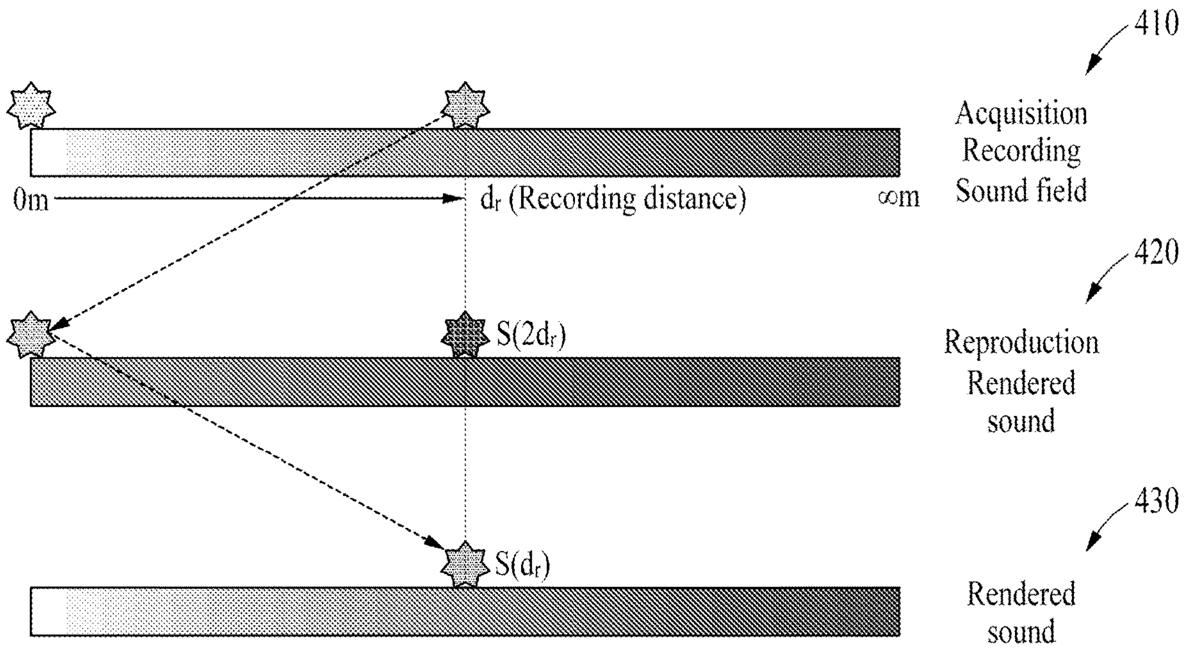
FIG. 4 is a diagram illustrating a change in timbre by air absorption through a sound source acquisition and rendering stage according to an example embodiment.

FIG. 4 is a diagram illustrating a change in timbre by air absorption through a sound source acquisition and rendering stage according to an example embodiment.

FIG. 4 shows example timbre changes in a recording environment 410, a first reproduction environment 420, and a second reproduction environment 430. In FIG. 4, the timbre changes are expressed in gray levels.

As a sound source propagates in an arbitrary space, there may also be attenuation by air absorption in addition to distance attenuation according to the 1/r law. The attenuation by air absorption (or air absorption attenuation) may occur as a low-pass filter (LPF) effect, and the timbre of the sound source may vary depending on a distance. The air absorption attenuation by distance may be determined according to temperature, humidity, and atmospheric pressure.

In the case of a general recording sound source, air absorption by recording distance may be reflected in the sound source, and since the recording distance is considered zero (0) meters (m), the air absorption by recording distance may be duplicated during actual rendering. That is, when the recording distance is considered 0 m as in the first reproduction environment 420, even though an original sound source S(0) is recorded by a microphone that is separated by a distance $d_r$ from the original sound source S(0) in the recording environment 410, it may be considered that a recorded sound source $S(d_r)$ may be located at a distance of 0 m. Also, when the listener is located at $d_r$, the recorded sound source $S(d_r)$ may be considered to be propagated again by the distance $d_r$ and thus, the listener may finally hear a sound that has propagated as much as $2d_r$ and has undergone air absorption attenuation and may experience a timbre that is different from the original timbre. This phenomenon may be referred to as a superimposing problem, and in order to solve the superimposing problem, an air absorption rate may be applied to a distance obtained by subtracting the recording distance from the source distance when calculating the air absorption by distance during rendering. The second reproduction environment 430 may be an environment where the recording distance is applied as $d_r$, and the recorded sound source $S(d_r)$ is considered to be located at $d_r$, and in a case in which the listener is located at $d_r$, the recorded sound source $S(d_r)$ may be reproduced as it is without additional air absorption and the listener may thus experience the original timbre as it is.

As shown in FIG. 4, the original sound source S(0) in an actual environment may show a timbre change due to air absorption by a distance from the origin point. The recorded sound source $S(d_r)$ may basically include air absorption depending on a distance from the origin point to an acoustic sensor. When this sound source is used in a 6DoF VR environment, the sound source may be rendered as a timbre of air absorption depending on the recording distance rather than the original sound source. That is, when the air absorption attenuation is processed based on the recording distance of Om, the air absorption attenuation amount for the recording distance may be doubled (i.e., $S(2d_r)$). To prevent this, the recorded sound source may need to be moved to the recording distance and rendered as it is at the recording distance.

Figure 5:
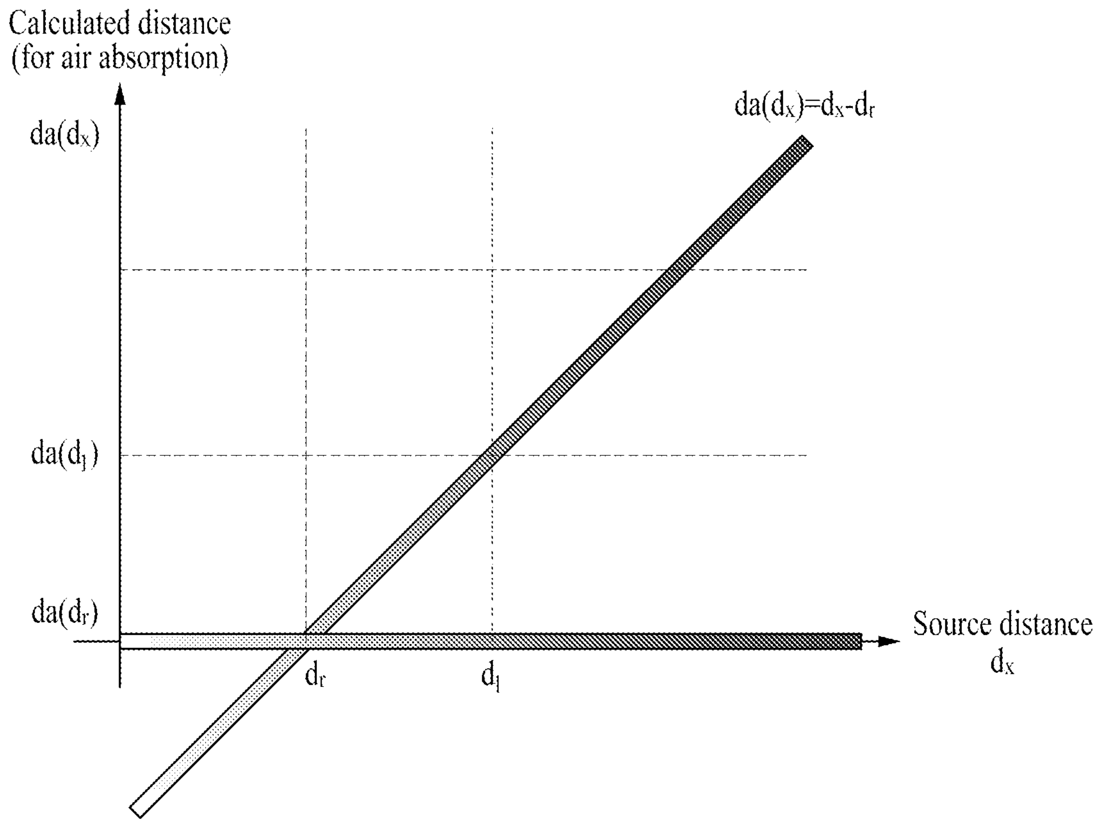
FIG. 5 is a diagram illustrating an operation of calculating a distance for determining an air absorption attenuation amount according to an example embodiment.

FIG. 5 is a diagram illustrating an operation of calculating a distance for determining an air absorption attenuation amount according to an example embodiment.

FIG. 5 shows an example relationship between a distance between a listener and a sound source in a 6DoF virtual space and a distance used to calculate an air absorption attenuation amount. To calculate the air absorption attenuation amount, a recording distance $d_r$ may be subtracted from a source distance $d_x$. The air absorption attenuation amount may be determined based on a distance $da(d_x)$ obtained by subtracting the recording distance $d_r$ from the source distance $d_x$.

For a distance greater than the recording distance, air absorption attenuation may match an actual distance in an original space, and thus a timbre of a sound source may be maintained based on a distance from an original location of the sound source. In addition, for a distance shorter than the recording distance, a negative distance value may be applied, and air absorption attenuation may be applied in a negative direction, which may amplify a high-frequency band. An operation of preventing amplification of the high-frequency band at the negative distance value will be described in detail below with reference to FIG. 8. As a result, a renderer may provide an effect of compensating for air absorption attenuation by recording distance that occurs during recording.

Figure 6:
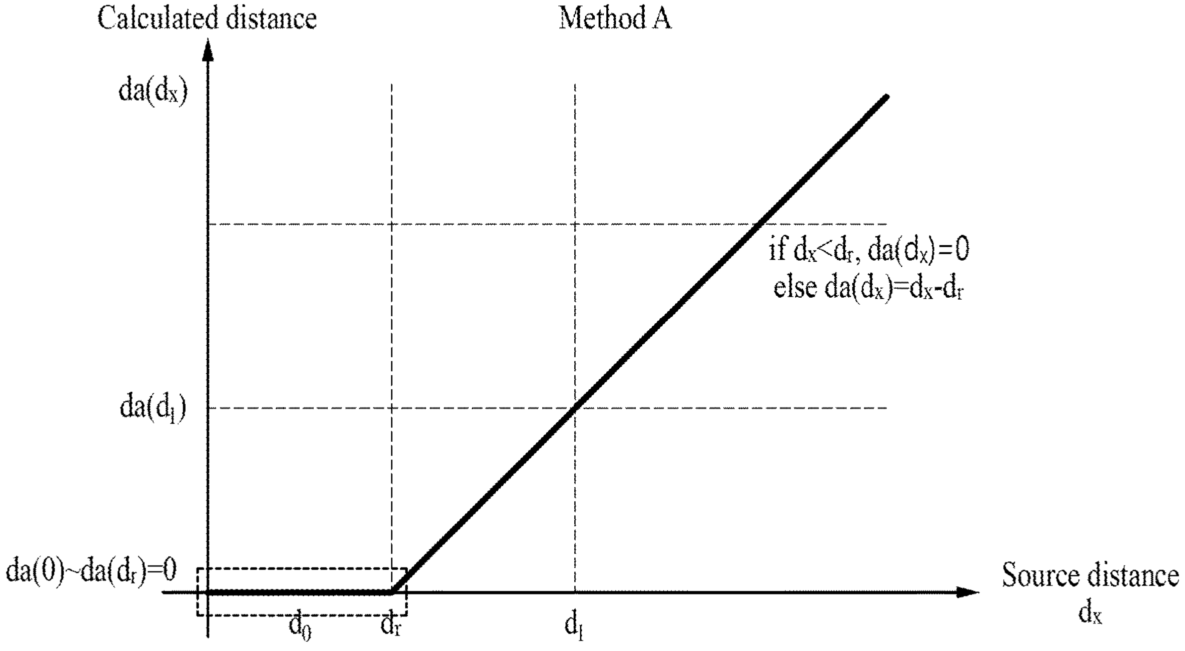
FIGS. 6 and 7 are diagrams illustrating operations performed in a case in which a source distance is less than a recording distance according to an example embodiment.
Figure 7:
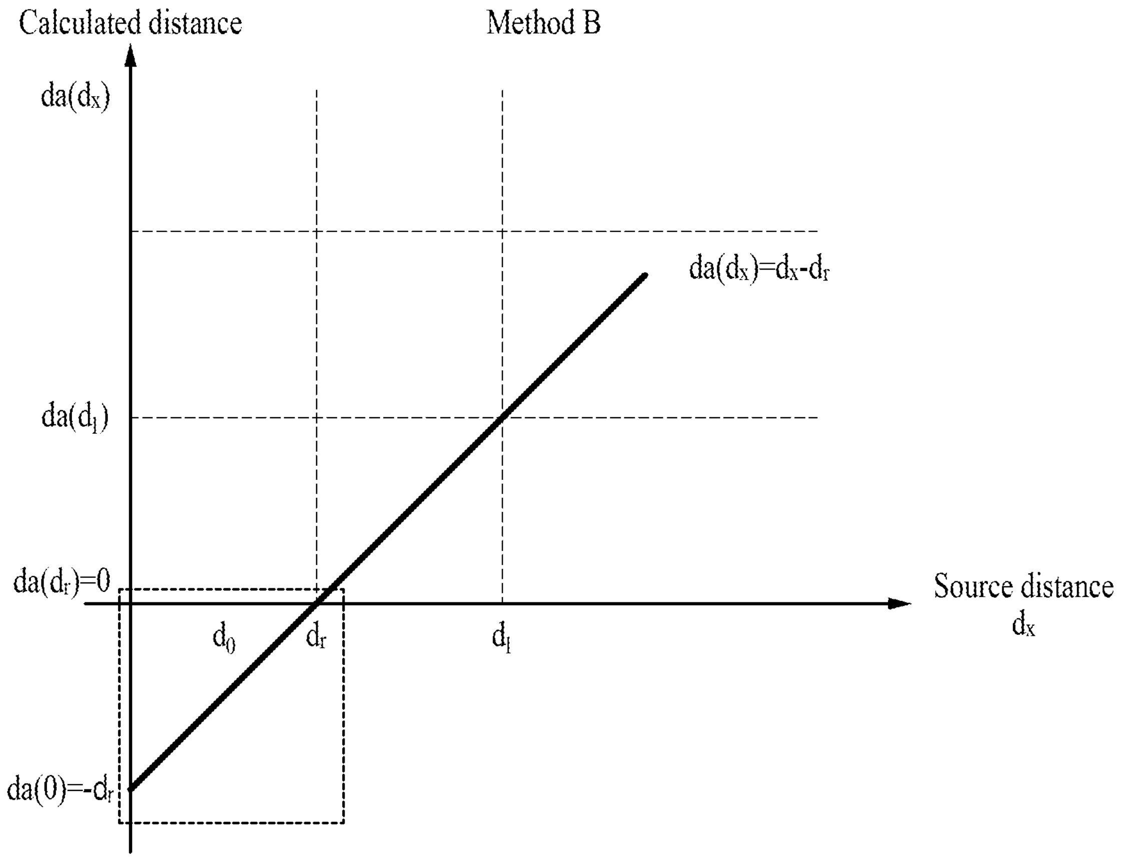

FIGS. 6 and 7 are diagrams illustrating operations performed in a case in which a source distance is less than a recording distance according to an example embodiment.

Referring to FIG. 6, in a case in which a content creator does not desire to compensate for a negative direction for air absorption at a location shorter than a recording distance, a calculated distance $da(d_x)$ may be set to 0, and this method may be referred to herein as method A for the convenience of description.

In method A, as expressed in Equation 2 below, $da(d_x)$ may be set to 0 when $d_x$ is shorter than $d_r$, otherwise, $da(d_x)$ may be determined to be $d_x$-$d_r$. In this case, fixed EQ may be applied to all frequency bands.

$$\text{if } d_x < d_r,\ da(d_x) = 0 \qquad \text{[Equation 2]}$$

$$\text{else } da(d_x) = d_x - d_r$$

Referring to FIG. 7, by compensating for the negative direction for air absorption at the location shorter than the recording distance, the calculated distance $da(d_x)$ may be determined to be $d_x$–$d_r$, which may be referred to herein as method B for the convenience of description.

In method B, the calculated distance $da(d_x)$ may be determined as expressed in Equation 3 below. In this case, compensation EQ for the negative distance may be applied with a 0 dB limit, which will be described in detail below with reference to FIG. 8.

$$da(d_x)=d_x-d_r \qquad \text{[Equation 3]}$$

To control the usage of method A or B, a flag (e.g., authoring parameter) may be used. For example, the flag may be "noInverseMediumAttenuation." In this example, "noInverseMediumAttenuation" may be a new authoring parameter that may be added to the renderer to disable/enable "inverse air absorption" instead of a RecDUsage field proposed as an original method. In this case, when "noInverseMediumAttenuation" is not declared, "compensation EQ for a minus distance (or negative distance) with 20 dB limit" may be used.

Figure 8:
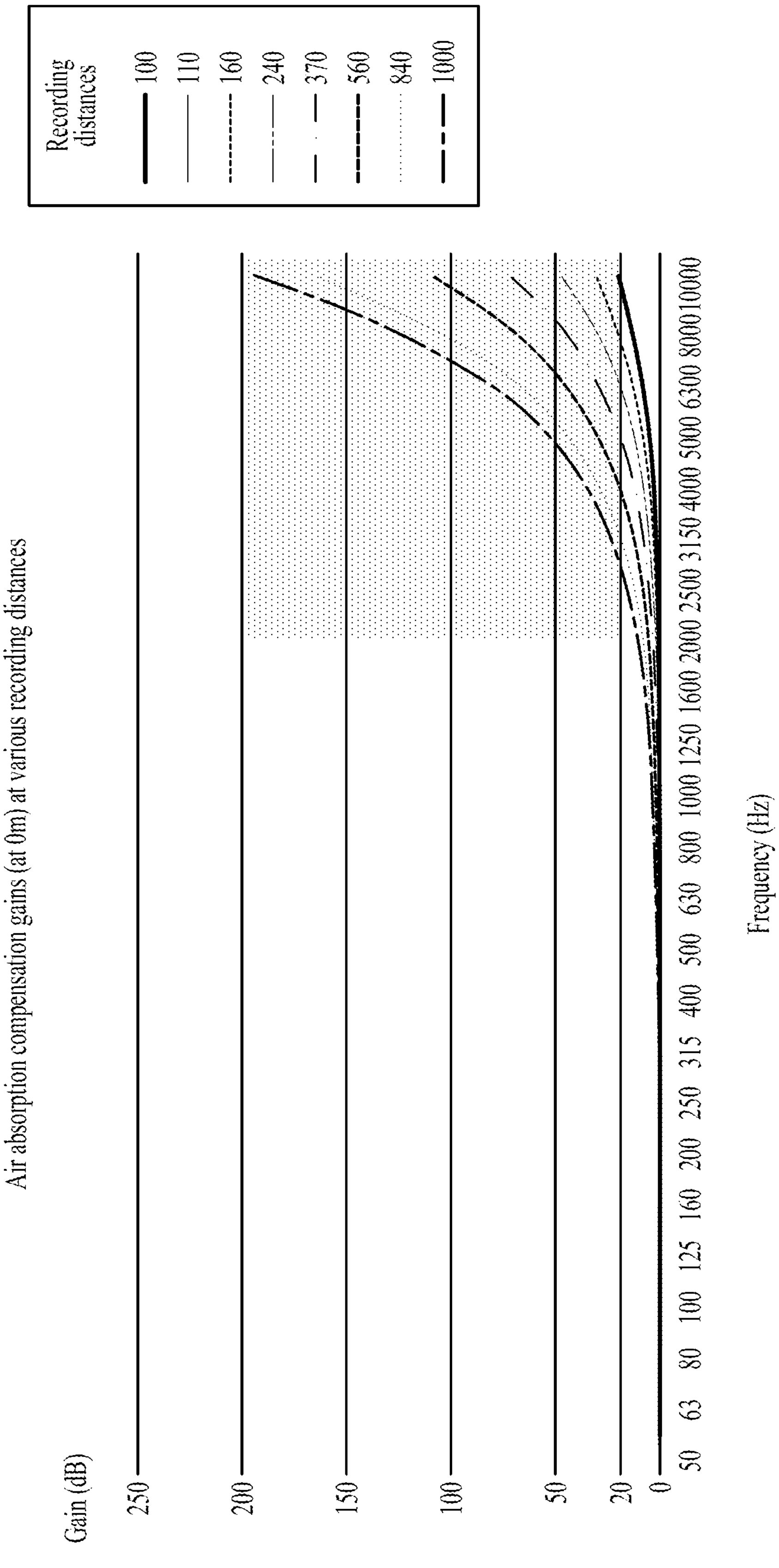
FIG. 8 is a diagram illustrating an operation of preventing a distortion that may occur when a negative distance value is obtained by subtracting a recording distance from a source distance according to an example embodiment.

FIG. 8 is a diagram illustrating an operation of preventing a distortion that may occur when a negative distance value is obtained by subtracting a recording distance from a source distance according to an example embodiment.

As described above, excessive amplification may occur due to compensation for a minus (negative) distance. As shown in FIG. 8, when a recording distance is approximately 100 m or greater, amplification of 20 dB or greater may occur in a high-frequency band, and such excessive amplification may cause clipping distortion. In the case of supporting a 6DoF movement of a user, the user may approach closer to a sound source. Therefore, this situation may occur.

For example, assuming a recording distance of 100 m to 300 m, a waveform that may occur when a jet sound source of battle content is compensated to the maximum may be as follows. In the case of compensating for the recording distance of 100 m, clipping may rarely occur, in the case of compensating for the recording distance of 200 m, clipping may frequently occur, and in the case of compensating for the recording distance of 300 m, clipping may severely occur.

In this case, a spectrum difference of each waveform may be as follows. It may be verified that a spectrum from the compensation for the recording distance of 100 m follows an air absorption attenuation curve up to 10 kHz defined as an air absorption attenuation coefficient, compared to the original waveform. However, in the case of the recording distance of 300 m, it may be verified that many distortions occur across the entire frequency band.

To prevent such distortions, it is necessary to limit an amplification amount for each frequency band, and limiting it to about 20 dB may largely reduce clipping. Thus, it may be expected that, clipping, which may occur intermittently, may be effectively prevented through a limiter at the end of the renderer.

Figure 9:
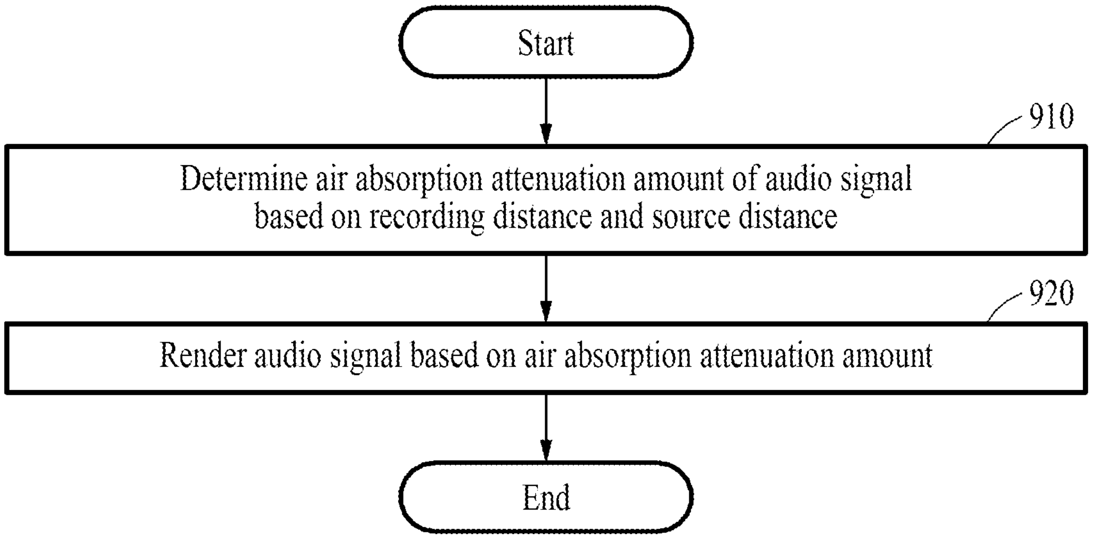
FIG. 9 is a flowchart illustrating an audio rendering method according to an example embodiment.

FIG. 9 is a flowchart illustrating an audio rendering method according to an example embodiment.

Operations to be described below may be performed in sequential order but are not necessarily performed in sequential order. For example, the operations may be performed in different orders, and at least two of the operations may be performed in parallel. Operations 910 and 920 may be performed by at least one component (e.g., a processor and/or memory) of an electronic device.

In operation 910, the electronic device may determine an air absorption attenuation amount of an audio signal based on a recording distance included in metadata of the audio signal and a source distance between a sound source of the audio signal and a listener. The electronic device may determine the air absorption attenuation amount based on a distance obtained by subtracting the recording distance from the source distance. When the source distance is shorter than the recording distance, the electronic device may determine the air absorption attenuation amount based on a predetermined distance value.

When the recording distance is not included in the metadata of the audio signal, the recording distance may be determined to be a reference distance included in the metadata of the audio signal or to be zero (0). The recording distance may be stored in a recDistance parameter included in a bitstream syntax of each audio signal. The recording distance may be stored in the recDistance parameter for each sound source of the audio signal. The recording distance may be any one of a distance between the sound source of the audio signal and a recording sensor, a distance determined according to the timbre of the sound source, and a predetermined distance.

In operation 920, the electronic device may render the audio signal based on the air absorption attenuation amount. When the source distance is shorter than the recording distance, the electronic device may render the audio signal by applying a compensation equalizer that limits the size to a predetermined size.

For the operations of FIG. 9, reference may be made to what has been described above with reference to the accompanying drawings, and a more detailed description thereof will thus be omitted here.

Even though the reference distance is almost the same as the recording distance, their meanings and uses may be different. The reference distance may refer to a distance for setting a gain of the sound source to 0 dB to adjust the loudness (or size) of the sound source according to each distance in geometric spreading attenuation. A content creator may set a reference distance value such that an attenuation curve according to distance is appropriate based on the size of the sound source. In this case, GainDb may be used together to balance the sound level of the entire scene according to the reference distance value.

The recording distance, a distance between the sound source and a microphone, may be determined as follows. to be processed at each renderer stage according to a sound source in the renderer and a geometrical state of a listener, it may not be recommended to directly modify sound source properties such as gain and EQ in the encoder without transmitting them as parameters.

In addition, for example, when the recording distance is 100 m or greater, a distortion by excessive amplification of a high-frequency band may be expected to compensate for air absorption attenuation for the recording distance. In this case, when the encoder uses a method of limiting or normalizing a gain value for each frequency band to avoid such distortion, a change in the timbre of the sound source or a change in the signal level may occur, which may degrade the performance of the renderer. Therefore, the compensation for air absorption attenuation by the recording distance may be performed in the renderer.

FIG. 10 is a diagram illustrating a source code of Distance.cpp according to an example embodiment.

To apply a recording distance described above, a definition of a recording distance parameter (recDistance) may be added to attributes of each sound signal defined in EIF, that is, AudioStream. RecDistance may be defined in a similar form to that of a reference distance as shown in Table 1 below, and in a case in which a recording distance value is not specified, it may be the same value as the reference distance.

TABLE 1

<AudioStream>
Declares an audio stream provided by a local audio file. AudioElements can use it as signal source. The file can have any number of channels but must be at a sampling rate of 48000 Hz. For the evaluation platform, input channels for the renderers have to be specified (indices starting with 0).

| Attribute | Type | Flags | Default | Description |
|---|---|---|---|---|
| id | ID | R | | Identifier |
| file | String | R | | Path of the audio file (relative to scene.xml file) |
| aepInputChannels | List of integers or integer range | R | | List of the channel indices, that the renderers are supplied with the signal in the Audio Evaluation Platform (AEP) |
| recDistance | Float >= 0 | O | 0 | Recording distance (m) |

During actual recording, the recording distance may be determined through actual measurement of the distance between the sound source and the recording sensor.

In a case in which a recording distance of a sound source to be used is unknown, an author may set a reasonable recording distance according to the timbre of the sound source. For computer-generated sound sources, it is not possible to set the recording distance, and in theory, setting it to Om may be ideal.

For recording a sound source on the spot, the recording distance may need to be measured and added as a property of a sound source signal by a sound engineer. Alternatively, the author may estimate the recording distance in a given space and add it when creating content. In a case in which there is no recording distance information, the reference distance value may be used as a default recording distance value.

In a case in which the recording distance has already been determined and the reference distance is set to the same value as the recording distance, GainDb may be used to maintain the existing attenuation curve and size of the sound source. In this case, the recording distance may be set to the same value as the reference distance.

When the encoder compensates for air absorption attenuation by the recording distance, there may be an advantage in not having to modify a bitstream and a renderer. However, because a sound source in a 6DoF environment is required A part related to the recording distance parameter may be added to a bitstream syntax and a data structure for renderer SW (software).

For the bitstream syntax, the recDistance parameter may be added to the bitstream syntax of each audio stream, as shown in Table 2 below.

TABLE 2

| Syntax | No. of bits | Mnemonic |
|---|---|---|
| audioStreams( ) | | |
| { | | |
| audioStreamsCount = GetCountOrIndex( );; | | |
| for (int i = 0; i < audioStreamsCount; i++) { | | |
| audioStreamId; = GetId( ) | | |
| audioStreamFilePath; | 8.* | cstring |
| aepInputChannelsCount = GetCountOrIndex( ); | | |
| for (int j = 0; j < aepInputChannelsCount; j++) { | | |
| aepInputChannelIndex = GetCountOrIndex( );; | | |
| } | | |
| recDistance = GetDistance(isSmallScene); | | |
| } | | |
| } | | |

For the data structure of the renderer, the recDistance parameter for each sound source may be added as follows.

recDistance: this value may be a recording distance (m) of a given audio stream, and the recording distance may be a point at which a microphone is located.

Lastly, in AParam, a NoInverseMediumAttenuation parameter may be added to control air absorption processing, as shown in Table 3 below.

TABLE 3

```
AParam
enum data type
enum class AParam
{
   None = 0,
   NoDoppler = 1,
   NoReverb = 2,
   NoDistanceGain = 4,
   NoMediumAttenuation = 8,
   ForceNoDoppler = 16,
   NoInverseMediumAttenuation = 32,
};
```

Distance.cpp may include air absorption attenuation by a distance between a sound source and a listener, and this part may be implemented as a source code shown in FIG. 10. In the source code of FIG. 10, a 20 dB (i.e., 10 times) amplification limit may be considered to prevent excessive amplification of a high-frequency band by applying the subtraction of the recording distance to the distance calculation for calculating air absorption attenuation. In the case of method A, when a distance of the sound source is shorter than the recording distance, the calculated distance value may be fixed to 0. In the case of method B, the subtraction of the recording distance and a minimum operation for an excessive gain limit value may be additionally reflected in the calculation of the recording distance.

As shown in FIG. 10, a conditional branch and a subtraction operation may be added once in method A, and a subtraction operation and a MIN( ) operation may be added once in method B. These two operations may be performed on each update frame of each render item (RI). Therefore, it may be verified that an increase in complexity is negligible, and it may be determined intuitively that there is no need to perform additional complexity evaluation.

The example embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For the purpose of simplicity, the description of a processing device is used as singular; however, one skilled in the art will be appreciated that a processing device may include multiple processing elements and multiple types of processing elements. For example, a processing device may include multiple processors or a processor and a controller. In addition, different processing configurations are possible, such as, parallel processors.

The software may include a computer program, a piece of code, an instruction, or some combination thereof, to independently or collectively instruct or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as ROM, RAM, flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. An audio rendering method, comprising:

determining an air absorption attenuation amount of an audio signal based on a distance obtained by subtracting a recording distance from a source distance between a sound source of the audio signal and a listener; and rendering the audio signal based on the air absorption attenuation amount, wherein the recording distance is a distance between the sound source and a microphone that records the sound source.

2. The audio rendering method of claim 1, wherein the determining of the air absorption attenuation amount comprises:

in response to the source distance being shorter than the recording distance, determining the air absorption attenuation amount based on a predetermined distance value.

3. The audio rendering method of claim 1, wherein the rendering of the audio signal comprises:

in response to the source distance being shorter than the recording distance, rendering the audio signal by applying a compensation equalizer that limits a size to a predetermined size.

4. The audio rendering method of claim 1, wherein, when the recording distance is not comprised in metadata of the audio signal, the recording distance is determined to be a reference distance comprised in the metadata of the audio signal or a value of zero (0).

5. The audio rendering method of claim 1, wherein the recording distance is stored in a recDistance parameter comprised in a bitstream syntax of the audio signal.

6. The audio rendering method of claim 1, wherein the recording distance is stored in a recDistance parameter for the sound source of the audio signal.

7. A non-transitory computer-readable storage medium storing instructions that, when executed by a processor, cause the processor to perform the audio rendering method of claim 1.

8. An electronic device, comprising:

a processor; and a memory configured to store at least one processor-executable instruction, wherein, when the instruction is executed by the processor, the processor is configured to:

determine an air absorption attenuation amount of an audio signal based on a distance obtained by subtracting a recording distance from a source distance between a sound source of the audio signal and a listener; and render the audio signal based on the air absorption attenuation amount, wherein the recording distance is a distance between the sound source and a microphone that records the sound source.

9. The electronic device of claim 8, wherein the processor is configured to:

in response to the source distance being shorter than the recording distance, determine the air absorption attenuation amount based on a predetermined distance value.

10. The electronic device of claim 8, wherein the processor is configured to:

in response to the source distance being shorter than the recording distance, render the audio signal by applying a compensation equalizer that limits a size to a predetermined size.

11. The electronic device of claim 8, wherein, when the recording distance is not comprised in metadata of the audio signal, the recording distance is determined to be a reference distance comprised in the metadata of the audio signal or a value of zero (0).

12. The electronic device of claim 8, wherein the recording distance is stored in a recDistance parameter comprised in a bitstream syntax of the audio signal.

13. The electronic device of claim 8, wherein the recording distance is stored in a recDistance parameter for the sound source of the audio signal.

* * * * *